(12) United States Patent
Cho et al.

(10) Patent No.: US 11,310,356 B2
(45) Date of Patent: Apr. 19, 2022

(54) METHOD OF DISPLAYING CALL INFORMATION IN MOBILE COMMUNICATION TERMINAL AND MOBILE COMMUNICATION TERMINAL ADAPTED TO DISPLAY CALL INFORMATION

(71) Applicant: Samsung Electronics Co., Ltd., Gyeonggi-do (KR)

(72) Inventors: Hee-Jeong Cho, Seoul (KR); Kyoung-Ae Lim, Seoul (KR); Seung-Chul Choi, Daegu (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/926,451

(22) Filed: Mar. 20, 2018

(65) Prior Publication Data

US 2018/0213075 A1 Jul. 26, 2018

Related U.S. Application Data

(63) Continuation of application No. 11/377,365, filed on Mar. 17, 2006, now Pat. No. 9,924,015.

(30) Foreign Application Priority Data

Apr. 6, 2005 (KR) ........................ 10-2005-0028570

(51) Int. Cl.
*H04M 1/725* (2021.01)
*H04M 1/56* (2006.01)
(Continued)

(52) U.S. Cl.
CPC ............. *H04M 1/724* (2021.01); *H04M 1/56* (2013.01); *H04M 1/575* (2013.01); *H04M 1/7243* (2021.01); *H04M 2250/60* (2013.01)

(58) Field of Classification Search
CPC ....... H04M 2250/60; H04M 1/274583; H04M 1/72583; H04M 1/56; H04M 1/274508;
(Continued)

(56) References Cited

U.S. PATENT DOCUMENTS

| 6,381,474 | B1 * | 4/2002 | Kraft ................. H04M 1/72469 455/566 |
| 6,721,412 | B1 | 4/2004 | Youngs |

(Continued)

FOREIGN PATENT DOCUMENTS

| KR | 1020020096578 | 12/2002 |
| KR | 1020030032285 | 4/2003 |

(Continued)

OTHER PUBLICATIONS

Samsung Electronics; "GPRS Telephone SGH-D500" Internet Citation; Nov. 2004, XP002364006; pp. 51-53.

(Continued)

*Primary Examiner* — Liton Miah
(74) *Attorney, Agent, or Firm* — The Farrell Law Firm, P.C.

(57) ABSTRACT

Disclosed is a method of and apparatus for displaying call information in a mobile communication terminal and a mobile communication terminal adapted to display call information. The method includes the steps of checking the call information when a call occurs, updating and storing the call information according to a status of the call, and displaying the updated call information.

10 Claims, 7 Drawing Sheets

(51) Int. Cl.
*H04M 1/57* (2006.01)
*H04M 1/724* (2021.01)
*H04M 1/7243* (2021.01)

(58) Field of Classification Search
CPC ... H04M 1/57; H04M 3/2218; H04M 2201/38
See application file for complete search history.

(56) References Cited

U.S. PATENT DOCUMENTS

| | | | |
|---|---|---|---|
| 7,007,239 B1 | 2/2006 | Hawkins et al. | |
| 7,551,899 B1* | 6/2009 | Nicolas | H04M 1/2746 455/73 |
| 8,001,120 B2* | 8/2011 | Todd | H04M 1/2746 707/736 |
| 8,300,780 B1* | 10/2012 | Davis | H04M 1/575 379/88.19 |
| 2001/0012347 A1 | 8/2001 | Fujino et al. | |
| 2002/0065108 A1 | 5/2002 | Tsukamoto | |
| 2002/0151334 A1 | 10/2002 | Sharma | |
| 2003/0148790 A1* | 8/2003 | Pappalardo | H04M 1/27475 455/558 |
| 2003/0185363 A1 | 10/2003 | Cerami | |
| 2004/0102225 A1* | 5/2004 | Furuta | H04M 1/72403 455/566 |
| 2005/0059384 A1* | 3/2005 | Kuusinen | H04M 1/575 455/414.1 |
| 2005/0085274 A1* | 4/2005 | Lee | H04M 1/2746 455/566 |
| 2005/0130631 A1 | 6/2005 | Maguire et al. | |
| 2005/0148331 A1 | 7/2005 | Sharon et al. | |
| 2005/0152511 A1 | 7/2005 | Stubley | |
| 2006/0030369 A1 | 2/2006 | Yang | |
| 2006/0056606 A1* | 3/2006 | Bocking | H04M 15/28 379/112.01 |
| 2006/0205432 A1* | 9/2006 | Hawkins | H04M 1/27475 455/552.1 |
| 2008/0123829 A1 | 5/2008 | Smith | |

FOREIGN PATENT DOCUMENTS

| | | |
|---|---|---|
| KR | 1020040041227 | 5/2004 |
| TW | 200412127 | 7/2004 |
| TW | 1230006 | 3/2005 |
| TW | 200511809 | 3/2005 |
| WO | WO 03/056789 | 7/2003 |
| WO | WO 2004/025970 | 3/2004 |
| WO | WO 2005/025191 | 3/2005 |

OTHER PUBLICATIONS

European Search Report dated Dec. 6, 2016 issued in counterpart application No. 06007042.2-1972, 9 pages.
European Search Report dated Jan. 27, 2017 issued in counterpart application No. 15196375.8-1972, 12 pages.

* cited by examiner

| SEQUENCE NUMBER | CALL CLASSIFICATION | NAME | PHONE NUMBER | INFO. |
|---|---|---|---|---|
| 1 | RECEIVED CALL | HONG GIL DONG | 123-4567 | 3/25 14:03:35 |
| 2 | RECEIVED CALL | HONG GIL DONG | 123-4567 | 3/25 14:01:25 |
| 3 | DIALLED CALL | OFFICE | 456-7890 | 3/25 12:05:05 |
| 4 | DIALLED CALL | OFFICE | 456-7890 | 3/24 19:20:30 |
| 5 | DIALLED CALL | NO NAME | 890-5353 | 3/23 11:45:45 |
| 6 | DIALLED CALL | OFFICE | 456-7890 | 3/22 11:00:30 |
| 7 | MISSED CALL | HWANG JIN YEE | 789-7777 | 3/22 10:30:30 |

FIG.4A

| RECEIVED CALL | |
|---|---|
| HONG GIL DONG (2) | 123-4567 |
| | |
| | |

(c)

| MISSED CALL | | |
|---|---|---|
| HONG GIL DONG | 123-4567 | 3/25 14:03:35 |
| HONG GIL DONG | 456-7890 | 3/25 14:01:25 |
| | | |

(c')

| DIALLED CALL | |
|---|---|
| OFFICE (3) | 456-7890 |
| NO NAME (1) | 890-5353 |
| | |

(d)

| DIALLED CALL | | |
|---|---|---|
| OFFICE | 456-7890 | 3/25 12:05:05 |
| OFFICE | 456-7890 | 3/24 19:20:30 |
| OFFICE | 456-7890 | 3/22 11:00:30 |

(d')

| MISSED CALL | |
|---|---|
| HWANG JIN YEE (1) | 789-7777 |
| | |
| | |

(e)

| MISSED CALL | | |
|---|---|---|
| HWANG JIN YEE | 789-7777 | 3/22 10:30:30 |
| | | |
| | | |

METHOD OF DISPLAYING CALL INFORMATION IN MOBILE COMMUNICATION TERMINAL AND MOBILE COMMUNICATION TERMINAL ADAPTED TO DISPLAY CALL INFORMATION

PRIORITY

This application is a continuation of application Ser. No. 11/377,365 filed with the U.S. Patent and Trademark Office on Mar. 17, 2006, and claims the benefit under 35 U.S.C. § 119(a) of Application No. 2005-28570 filed with the Korean Intellectual Property Office on Apr. 6, 2005, the entire disclosure of each of which is hereby incorporated by reference.

BACKGROUND OF THE INVENTION

1. Field

The present invention relates to a mobile communication terminal method and apparatus. More particularly, the present invention relates to a method and apparatus for displaying call information in a mobile communication terminal.

2. Description of the Related Art

The recent increase in the use of portable terminals has produced an increase in volume in the amount of calls received and dialed by users. Therefore, the amount of lists comprising information according to the received and dialed calls has greatly increased. For example, when the reception and origination of calls occur by a preset number or for predetermined duration in a mobile communication terminal, only the latest information about the occurring calls is memorized in a corresponding list by sequentially deleting old information, which is previously stored, from the list. When call reception/origination occurs with respect to the same phone number, since the occurrence information about the call reception/origination is sequentially displayed, it is difficult for a user to determine the state of the call reception/origination for the phone number.

Accordingly, there is a need for an improved method for allowing a user to easily determine call information according to the state of call reception/origination and the success of call connection.

SUMMARY

An aspect of exemplary embodiments address at least the above problems and/or disadvantages and to provide at least the advantages described below. Accordingly, exemplary embodiments have been made to solve the above-mentioned problems, including a method for controlling a communications device is provided that includes displaying on a first window, for a plurality of call items, information of a counterpart communications device, a number of occurred calls with the counterpart communications device, and a call type including one of a received call type, a dialed call type, and a missed call type; and displaying at least one detailed item for a selected call item on a second window, upon user selection of the call item, with the at least one detailed item for each call of the number of occurred calls displayed on the second window including a time point of the call occurrence or a time point of call connection.

Another aspect provides a communications device that includes a display and at least one processor configured to control displaying on a first window of the display, for a plurality of call items, information of a counterpart communications device, a number of occurred calls with the counterpart communications device, and a call type including one of a received call type, a dialed call type, and a missed call type, and displaying at least one detailed item for a selected call item on a second window, upon user selection of the call item, with the at least one detailed item for each call of the number of occurred calls displayed on the second window including a time point of the call occurrence or a time point of call connection.

A further aspect provides a method for controlling a communications device, with the method including displaying, on a display of the communications device, a number of at least one occurred call; detecting, by a processor of the communications device, an occurrence of another call; determining a phone number of at least one counterpart communications device of the at least one occurred call and a phone number of the another call; if the determined phone numbers are the same, increasing the number of the at least one occurred call that is displayed on the display; if the determined phone numbers are different, generating information of another counterpart communications device corresponding to the another call and displaying the generated information on the display of the communications device; upon an occurrence of a further call after determining that the phone numbers are different, generating information of a further counterpart communications device corresponding to the further call if a phone number of the further call is different than the phone number of the another call; and displaying the generated information of the further counterpart communications device.

A still further aspect provides a communications device that includes a display and at least one processor configured to control displaying, on a display of the communications device, a number of at least one occurred call; detecting, by a processor of the communications device, an occurrence of another call; determining a phone number of at least one counterpart communications device of the at least one occurred call and a phone number of the another call; if the determined phone numbers are the same, increasing the number of the at least one occurred call that is displayed on the display; if the determined phone numbers are different, generating information of another counterpart communications device corresponding to the another call and displaying the generated information on the display of the communications device; upon an occurrence of a further call after determining that the phone numbers are different, generating information of a further counterpart communications device corresponding to the further call if a phone number of the further call is different than the phone number of the another call; and displaying the generated information of the further counterpart communications device.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other objects, features and advantages of certain exemplary embodiments of the present invention will be more apparent from the following detailed description taken in conjunction with the accompanying drawings, in which:

FIGS. 4A to 4C are views showing call information displayed in a mobile communication terminal according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
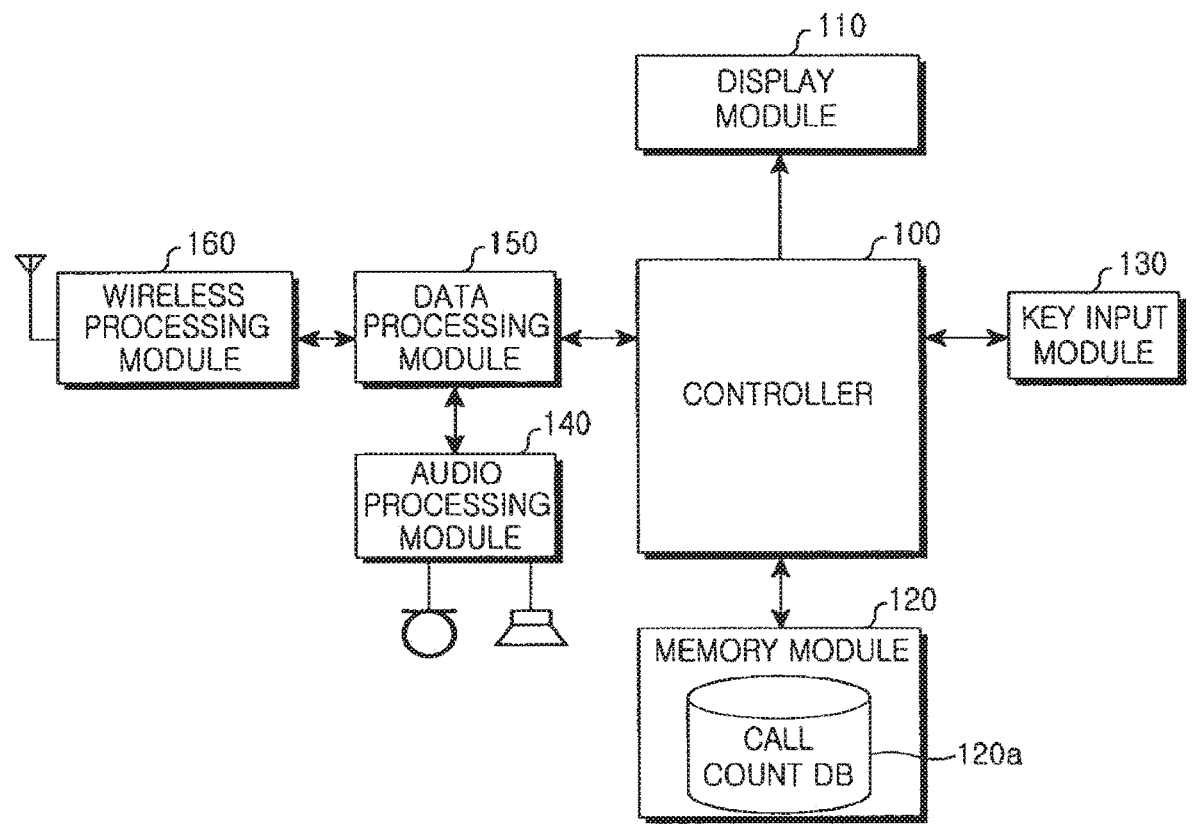
FIG. 1 is a block diagram illustrating the structure of a mobile communication terminal according to a preferred exemplary embodiment of the present invention.

FIG. 1 is a block diagram illustrating the structure of a mobile communication terminal according to an exemplary embodiment of the present invention.

A controller 100 controls the operation of a mobile communication terminal. In particular, the controller 100 according to an exemplary embodiment of the present invention performs a control operation in such a manner that the number of call occurrences is stored in a call count database 120a of a memory module 120 by accumulating the number of the call occurrences according to the state of call reception/origination and the success of call connection. In addition, when the controller 100 receives user menu input allowing the display of a list having the accumulated number of the call occurrences, the controller 100 controls a display module 110 to display call information including the accumulated number of the call occurrences. When the controller 100 receives a user key input allowing the display of detailed items of the displayed call information, the controller 100 performs a control operation in such a manner that the list of detailed items is displayed on a corresponding window according to the state of a call occurrence. When a call occurs, the controller 100 determines if the accumulated number of call occurrences corresponding to the occurring call exceeds a preset number. If the number of call occurrences for the same call number exceeds the preset number as the determination result, the controller 100 performs a control operation so that the latest call information according to the accumulated number of call occurrences is stored and the oldest call information, which is stored, is deleted.

The display module 110 displays a current state, each processing state, and each operation state according to a key input from a key input module 130. According to an exemplary embodiment of the present invention, the display module 110 displays information about call counterparts according to call reception/origination. In addition, the controller 100 displays the number of call reception/origination occurrences and the number of call connection success for the same phone number by determining call reception/origination or the success of call connection. When the display module 110 receives the user menu input allowing the display of the detailed items for the number of the call occurrences, the display module 110 displays information about a missed call and the number of missed calls according to the state of call occurrence (such as the state of call reception/origination and the state of a call connection success). In addition, when a user selects one of plural items from the displayed detailed items, the display module 110 displays detailed call information including the counterpart of the occurring call, the time point of the call occurrence, and the time of call connection.

A memory module 120 stores programs performed in the controller 120 or temporarily stores data processed through the programs. In addition, the memory module 120 stores various ringing sounds, MP3s, and moving pictures which can be output from the mobile communication terminal. Further, the memory module 120 stores data including various types of phone books and messages. This memory module 120 includes a read only memory (ROM) storing an operating system program, an electrically erasable programmable ROM (EEPROM), and a read access memory (RAM). The memory module 120 according to an exemplary embodiment of the present invention includes the call count database 12a storing the number of call occurrences by accumulating the number of call occurrence according to the state of the call reception/origination and the state of the call connection. When one of call origination, call reception, and call missing stored in the call count database 120a occurs above a preset number of call occurrences, information about the latest occurring call in the detailed information of calls according to the types of call occurrence is stored and information about the first occurring call is deleted from the call count database. The key input module 130 is used for receiving various types of data stored in the mobile communication terminal from a user. The key input module 130 is also used for receiving a signal allowing various functions of the mobile communication terminal. In particular, the key input module 130 according to an exemplary embodiment of the present invention is used for user key input allowing call termination or call origination. The key input module 130 according to an exemplary embodiment of the present invention is used for key input allowing the display of the detailed list having the accumulated number of call occurrences according to call occurrence.

An audio processing module 140 generally includes a voice coder (VCODER) and is driven under the control of the controller 100. The audio processing module 140 decodes coded voice data received from a wireless transceiver 160, converts voice data into an electrical voice signal, and then outputs the converted electrical voice signal to a speaker. The speaker converts the received electrical voice signal into an audible signal to be output. The audio processing module 140 also codes an electrical voice signal received from a microphone and outputs the coded voice signal to the wireless processing module 150. Additionally, the audio processing module 140 outputs various types of ringing sounds stored in the memory module 120 through a speaker when the call is received. If the wireless transceiver 160 receives a signal through a wireless channel having a frequency band using an antenna under the control of the controller 100, the wireless transceiver 160 down-converts the frequency band of the received signal and outputs the down-converted signal to the controller 100 according to the types of data. The data output to the controller 100 from the wireless transceiver module 160 includes character data, paging signals received through a paging channel, and signaling signals.

As described above, the overall structure of a mobile communication terminal according to an exemplary embodiment of the present invention includes a memory module, a call count database, a display module, and a controller. The memory module stores information according to call reception/origination and the state of call connection success. The call count database stores the number of call occurrences based on the stored information. The display module displays the call information when a menu allowing a list having the number of call occurrences to be displayed is selected from a user. Finally, the controller controls entire functions of the components.

Figure 2:
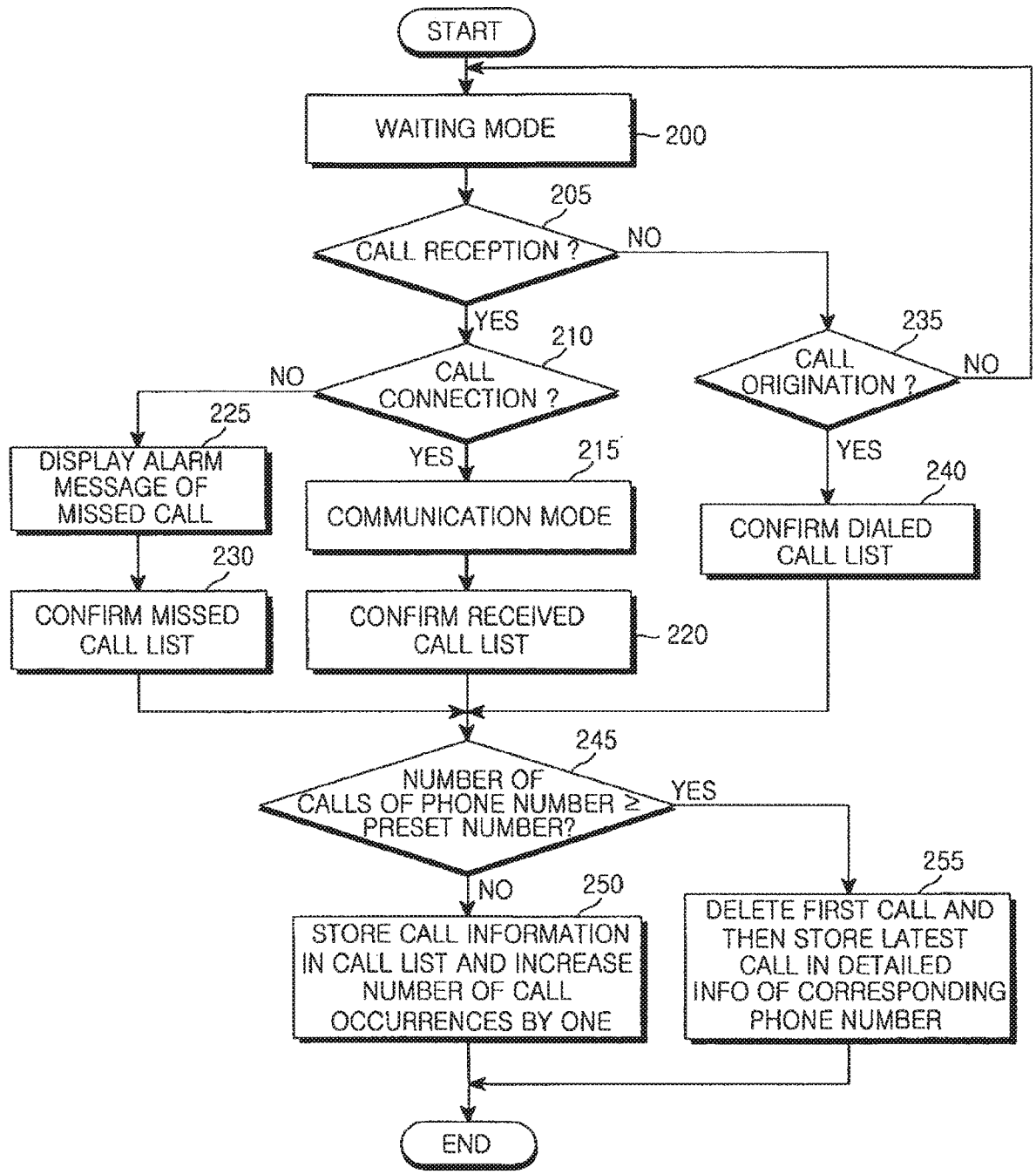
FIG. 2 is a flowchart illustrating an operation of storing call information in a mobile communication terminal according to an exemplary embodiment of the present invention.

FIG. 2 is a flowchart illustrating an operation of storing call information in a mobile communication terminal according to an exemplary embodiment of the present invention. The controller 100 of the mobile communication terminal has a waiting mode in step 200. When a call occurs in the waiting mode, the controller 100 determines if the call occurs by receiving the call in step 205. If it is determined that the call occurs by receiving the call in step 205, the controller 100 determines if a key allowing the connection to the received call is input in step 210.

If the controller 100 confirms that the key allowing the connection to the received call is input as the determination result in step 210, the controller 100 performs a communication mode in step 215. The controller 100 determines the list of the received calls of the memory module 120 in step 220 when performing the communication mode. According to the determination result in step 220, the controller 100 performs step 245 to determine if the number of call reception occurrences from a phone number of the received call exceeds a preset number of call reception occurrences. If the number of call reception occurrences from the phone number of the received call is less than the preset number of call reception occurrences as the determination result, the controller 100 stores the number of call reception occurrences from the phone number in the call count database 120a, which has the number of call reception occurrences from phone numbers stored in the memory module 120 by increasing the number of call reception occurrences by one. If the number of call reception occurrences from to a phone number of the received call exceeds the preset number of the call reception occurrences in step 245, the controller 100 deletes the first stored call information in detailed information about the phone number from the memory module 120 and stores the latest received call information in the memory module 120.

The controller 100 rings the bell reporting call reception during a predetermined time interval in step 210. If the controller 100 determines that it does not receive user key input allowing the connection to the received call, the controller 100 performs step 225 to display an alarm message for missed call, which reports that the connection to the received call is not achieved, on the display module 110. Also, the controller 100 determines the list of missed calls stored in the memory module 120 in step 230.

The controller 100 performs step 245 as the determination result in step 230 to determine if the number of missed calls, which is not connected to the phone number of the received call, exceeds a preset number. If the number of missed calls is less than the preset number, the controller 100 stores the received phone number in the memory module 120 and stores the number of call reception occurrences corresponding to the phone number in the call counter database 120a by increasing the number of the call reception occurrences by one. In addition, if the number of the call reception occurrences corresponding to the phone number of the received call exceeds the preset number of the call reception in step 245, the controller 100 deletes the first stored call information in detailed information about the phone number of the received call from the memory module 120 and stores the latest received call information in the memory module 120.

In step 205 a determination is made as to whether an occurring call is a received call. If the occurring call is not a received call, the controller 100 performs step 235 to determine if the occurring call is a dialed call. Accordingly, if the occurring call is the dialed call by receiving a user key input originating a call as the determination result, the controller 100 performs step 240 so as to determine a list of dialed calls stored in the memory module 120. Consequently, the controller 100 determines the number of the dialed calls in step 245 and performs steps of deleting information about dialed calls and then storing information about dialed calls, or increasing the number of dialed calls by one as the determination result.

When call information is stored in a mobile communication terminal according to an exemplary embodiment of the present invention as described above, the mobile communication terminal accumulates the number of call occurrences by determining the number of call occurrences for call types such as a dialed call, a received call, and a missed call according to call connection. Also, if the accumulated number of call occurrences exceeds the preset number, the first stored call information including information about each occurring call is deleted, and the latest occurring call information is stored.

Figure 3A:
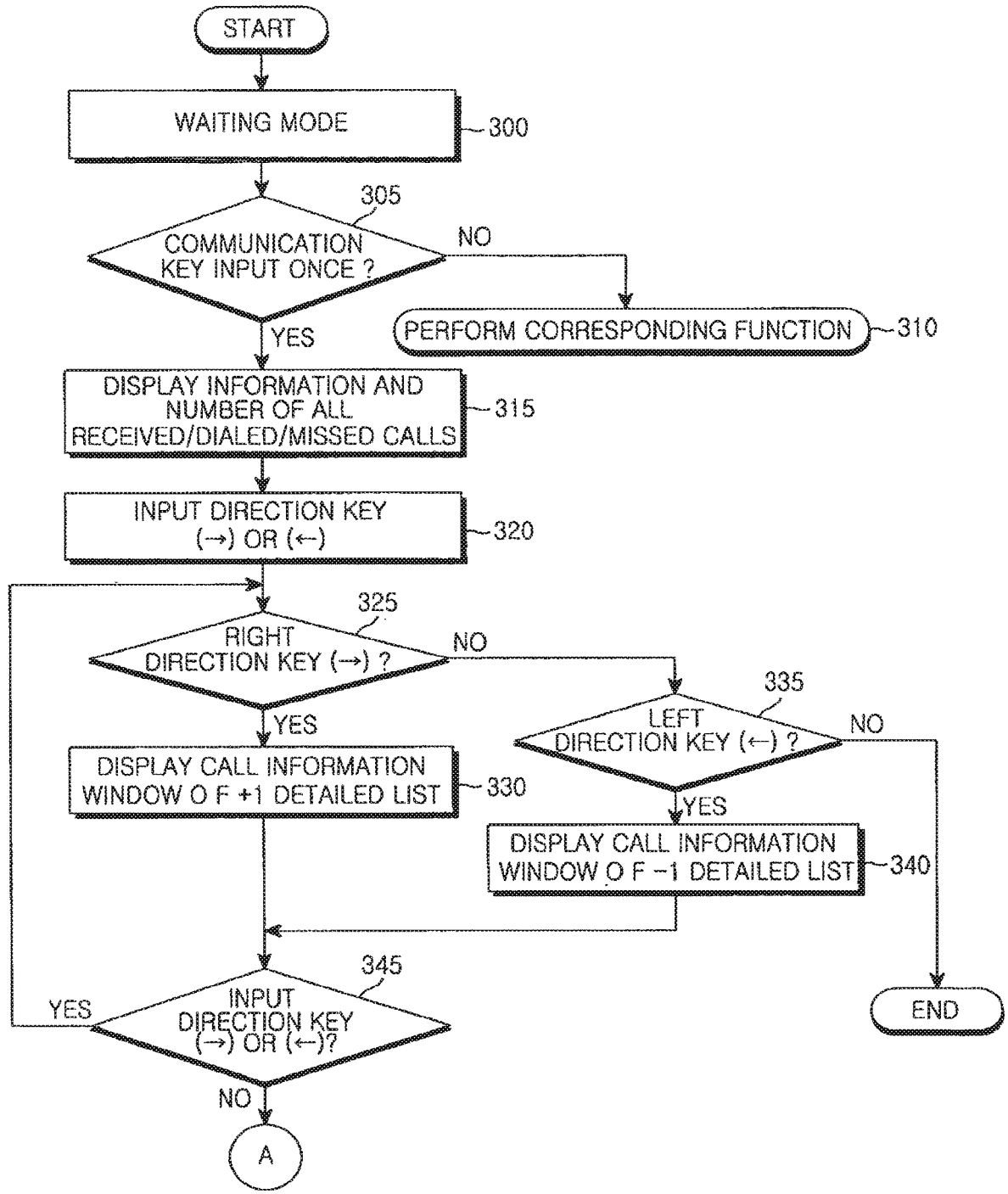
FIGS. 3A and 3B are flowcharts illustrating an operation for displaying call information in a mobile communication terminal according to an exemplary embodiment of the present invention.
Figure 3B:
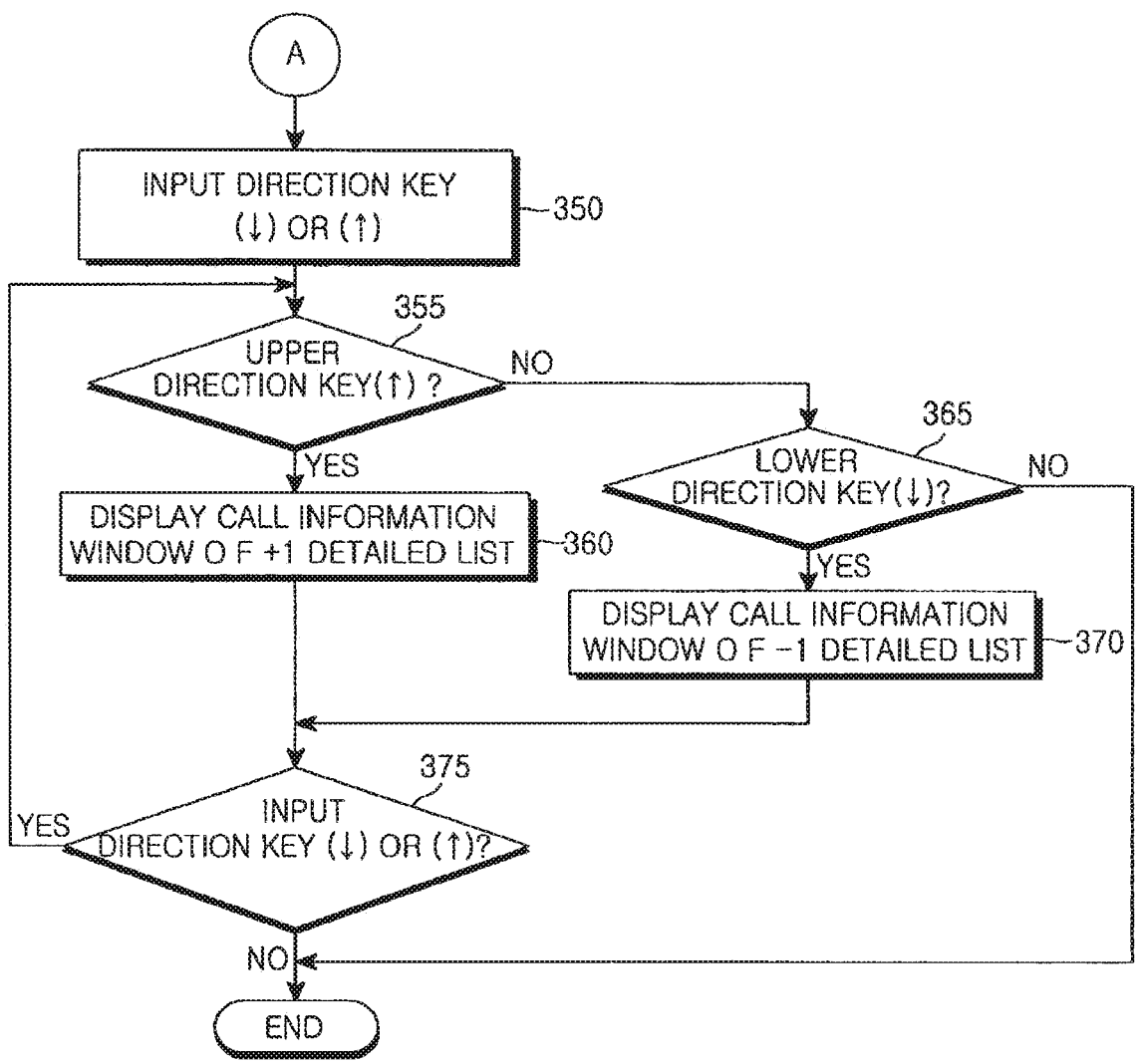
Figure 4B:
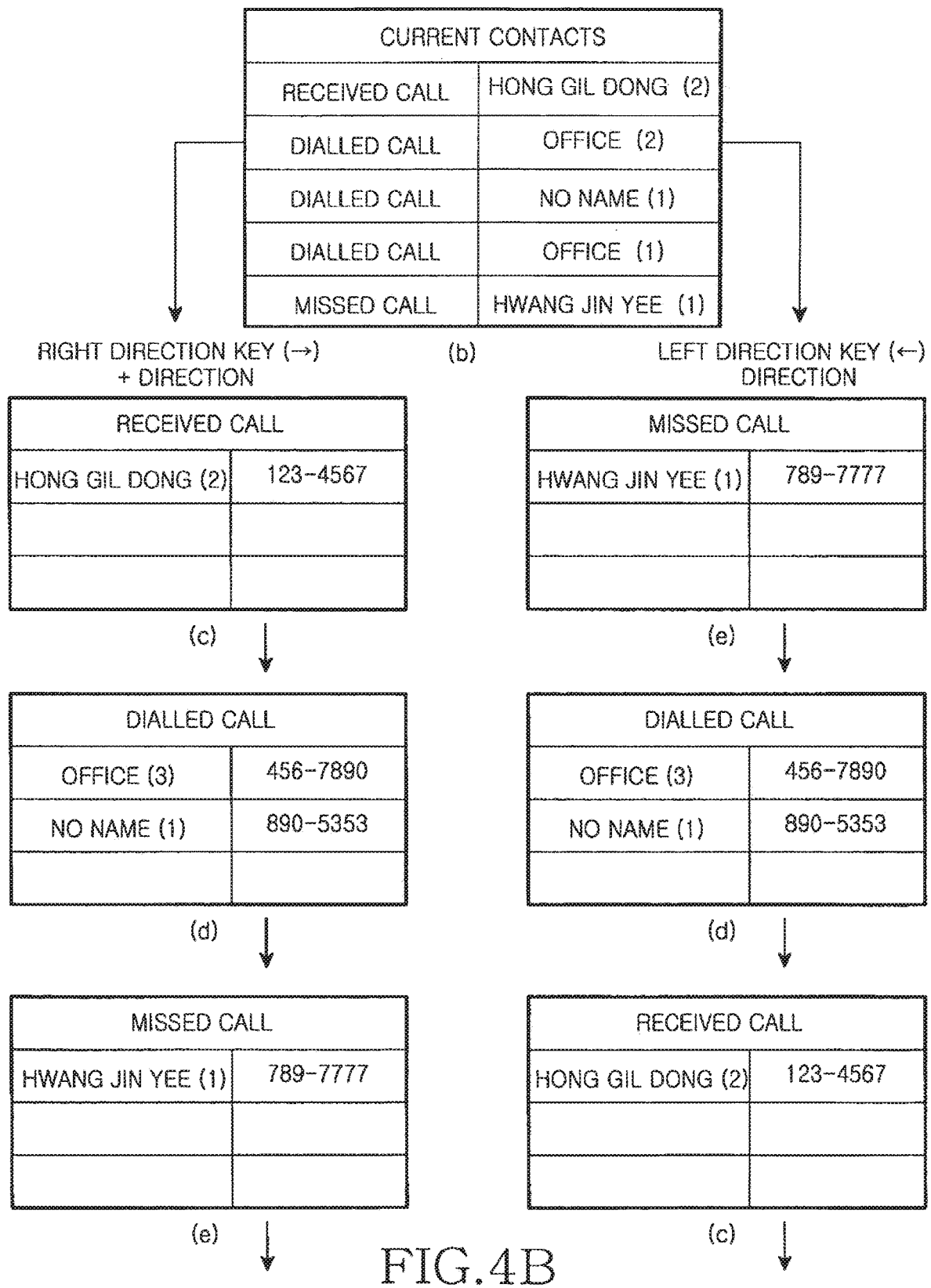

FIGS. 3A and 3B are flowcharts illustrating an operation of displaying call information in a mobile communication terminal according to an exemplary embodiment of the present invention. FIGS. 4A and 4B illustrate screen images when call information is displayed in a mobile communication terminal according to an exemplary embodiment of the present invention. The controller 100 has a waiting mode in step 300. If a signal reporting key input is generated in the waiting mode, the controller 100 determines if the input key allows the display of call occurrence information in step 305. According to an exemplary embodiment of the present invention, whenever the key (speaking key) allowing the display of the call occurrence information is input once, the call information is displayed. Accordingly, the controller 100 determines if the input key (speaking key) is input once in step 305. Thereafter, if the input key (speaking key) is not input as the determination result, the controller 100 performs step 310 so as to perform a function corresponding to the input key. In addition, if the controller 100 determines that the key (speaking key) is input once as the determination result, the controller 100 performs step 315.

The controller 100 displays information about all occurring calls in step 315 as shown in FIG. 4B. The screen image (b) shown in FIG. 4B is formed under the assumption that calls occur as shown in FIG. 4A. In other words, the displayed information includes information about icons or predetermined marks representing a received call, a dialed call, and a missed call. The displayed information also includes information about the number of call occurrences for each call and a counterpart of each call. The displayed number of call occurrences for all calls is obtained by analyzing information about a call counterpart stored in the memory module 120 and adding the number of received calls, dialed calls, or missed calls occurring with respect to the call counterparts according to the state of call reception/origination occurrences. The controller 100 performs step 320 so as to receive a user key input to allow the display of more detailed information according to the state of call occurrence with respect to call occurrence information about all calls. According to an exemplary embodiment of the present invention, the key allowing the display of the detailed information may be set as a left directional key "←" or a right directional key "→". Also, the right and left directions may be set as positive and negative directions, respectively, according to the input of the directional keys. In the case of the positive direction as shown in FIG. 4B, a sequence of displaying the detailed information according to the directional key input as shown in FIG. 4B is a sequence of displaying a window (b) for call occurrence information about all calls, a window (c) for information about received calls, a window (d) for information about dialed calls, and a window (e) for information about missed calls. Alternatively, if the input key is a key allowing the display of the detailed information in the negative direction, a window (b) for call occurrence information of all calls, a window (e) for information about missed calls, a window (d) for information about dialed calls, and a window (c) for information about received calls may be sequentially displayed.

The controller 100 receives the input of either a left directional key "←" or a right directional key "→" from a user and then determines the direction of the input key. Accordingly, the controller 100 determines if the input key is the right directional key "→" in step 325. If the input key is the right directional key "→" as the determination result, the controller 100 displays a call information window of a +1 detailed list. The window of the +1 detailed list shows the display sequence of the detailed list. For example, when the right directional key "→" is input in the displayed window (b) for call occurrence information about all calls in step 315, the window (c) for information about received calls may be displayed. Then, when the right directional key "→" is input in the displayed window (c) for information received calls, the window (d) for information about dialed calls may be displayed. In other words, according to information about a directional key input from a user, the controller 100 progresses in a +1 direction in step 330 from step 325 of determining the right key "→". Then, the controller 100 determines if the input key is the left directional key "←" in step 335 and progresses in a −1 direction in step 340 as the determination result. In addition, the controller 100 displays the windows by circulating the windows in +1 direction or −1 direction according to the input of the left key "←" or the right key "→" in step 345.

When one selected from a user among the displayed windows is displayed, the controller 100 receives the key allowing the selection of one among a plurality of displayed call items in step 350. According to an exemplary embodiment of the present invention, the key allowing the selection of one among a plurality of displayed call items may be an up directional key "↑" or a down directional key "↓". Accordingly, the controller 100 determines the direction of the received key in step 355. The controller 100 determines the key input from a user as the up directional key "↑" in step 355. The controller 100 performs steps 355 to 370 of selecting detailed items similarly to steps 330 to 340. When a key allowing the display of detailed items for call occurrence for 'Hong Gil Dong' to be displayed is input on a screen image (c) shown in FIG. 4C, call information occurring during a predetermined interval is displayed in detail as a window (c') shown in FIG. 4C. Similarly, detailed information about items selected on screen images (d) and (e) shown in FIG. 4C are displayed in detail as screen images (d') and (e') shown in FIG. 4C. The controller 100 displays the items in a +1 or −1 direction according to the input of the up directional key "↑" or the down directional key "↓" in step 375.

As described above, according to exemplary embodiments of the present invention, when displaying call information in a mobile communication terminal, a key allowing the display of the call information is input from a user. Therefore, call occurrence information about all calls such as a received call, a dialed call, and a missed call and the number of call occurrences according to a call counterpart are displayed. In addition, if a user inputs a key allowing the display of a detailed list according to the state of call occurrence, a window showing detailed items of call occurrence information according to the state of the call occurrence is displayed. The detailed items, which are displayed, include information about call occurrence according to a call counterpart. In addition, if one among the displayed items is selected, call information of the call counterpart during a predetermined time interval is displayed.

Although a list of detailed items according to call occurrence and one item displayed in the list are selected according to the input of a directional key in exemplary embodiments of the present invention, the item may be selected by inputting an item number according to a sequence of displaying the detailed items through a numeral key of a key input module. In addition, although description about only communication is given in exemplary embodiments of the present invention, an application may be made to the transmission/reception of a message in addition to the reception/origination of a call.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for controlling a communications device, the method comprising:
    displaying, on a display of the communications device, a first list of a plurality of call items regarding a plurality of call occurrences that sequentially occurred, wherein each of the plurality of call items includes information for a call type among a plurality of call types and a first number of call occurrences, that sequentially occurred, corresponding to the call type;
    receiving a first user input for a missed call type among the plurality of call types;
    in response to receiving the first user input, displaying, on the display of the communications device, a second list of one or more call items corresponding to the missed call type, wherein the one or more call items in the second list includes name information, a phone number, and a parenthetical numeral, adjacent to the name information, and indicating a corresponding number of missed calls that sequentially occurred from the phone number, and wherein the corresponding number of missed calls is displayed between parentheses as the parenthetical numeral;
    receiving a second user input on a first call item in the second list of the one or more call items for displaying call information of the first call item, and
    in response to receiving the second user input on the first call item in the second list of the one or more call items, displaying the call information of the first call item, wherein the call information includes information regarding a first counterpart corresponding to the first call item and detailed time information for each of a plurality of sequentially listed call occurrences associated with the first counterpart.

2. The method of claim 1, wherein the one or more call items are displayed line by line on the display.

3. The method of claim 1, wherein the information regarding the first counterpart includes at least a phone number.

4. The method of claim 1, the plurality of call types include a received call type, a dialed call type, and the missed call type.

5. The method of claim 1, wherein the first list includes information about all occurring calls corresponding to at least part of the plurality of call types.

6. A communications device comprising:
a display; and
at least one processor configured to control:
displaying, on the display of the communications device, a first list of a plurality of call items regarding a plurality of call occurrences that sequentially occurred, wherein each of the plurality of call items includes information for a call type among a plurality of call types and a first number of call occurrences, that sequentially occurred, corresponding to the call type;
receiving a first user input for a missed call type among the plurality of call types;
in response to receiving the first user input, displaying, on the display of the communications device, a second list of one or more call items corresponding to the missed call type, wherein the one or more call items in the second list includes name information, a phone number, and a parenthetical numeral, adjacent to the name information, and indicating a corresponding number of missed calls that occurred from the phone number, and wherein the corresponding number of missed calls is displayed between parentheses as the parenthetical numeral,
receiving a second user input on a first call item in the second list of the one or more call items for displaying call information of the first call item, and
in response to receiving the second user input on the first call item in the second list of the one or more call items, displaying the call information of the first call item, wherein the call information includes information regarding a first counterpart corresponding to the first call item and detailed time information for each of a plurality of sequentially listed call occurrences associated with the first counterpart.

7. The communications device of claim 6, wherein the one or more call items are displayed line by line on the display.

8. The communications device of claim 6, wherein the information regarding the first counterpart includes at least a phone number.

9. The communications device of claim 6, wherein the plurality of call types include a received call type, a dialed call type, and the missed call type.

10. The communications device of claim 6, wherein the first list includes information about all occurring calls corresponding to at least part of the plurality of call types.

* * * * *